US012503590B1

(12) United States Patent
Ahmed et al.

(10) Patent No.: US 12,503,590 B1
(45) Date of Patent: Dec. 23, 2025

(54) BIOCOMPOSITE MATERIAL COMPRISING REJECT BRINE AND PLANT-BIOMASS AND PREPARATION THEREOF

(71) Applicant: United Arab Emirates University, Al Ain (AE)

(72) Inventors: Waleed Ahmed, Al Ain (AE); Fatima Aljaberi, Al Ain (AE); Ali Al-Marzouqi, Al Ain (AE); Ameera Mohammad, Al Ain (AE)

(73) Assignee: UNITED ARAB EMIRATES UNIVERSITY, Al-Ain (AE)

( * ) Notice: Subject to any disclaimer, the term of this patent is extended or adjusted under 35 U.S.C. 154(b) by 0 days.

(21) Appl. No.: 19/187,073

(22) Filed: Apr. 23, 2025

(51) Int. Cl.
*C08L 67/04* (2006.01)

(52) U.S. Cl.
CPC ........... *C08L 67/04* (2013.01); *C08L 2201/06* (2013.01)

(58) Field of Classification Search
CPC ............ C08L 67/02; C08L 97/02; C08K 3/16
See application file for complete search history.

(56) References Cited

U.S. PATENT DOCUMENTS

| | | | | | |
|---|---|---|---|---|---|
| 3,941,688 | A | * | 3/1976 | Saitoh | B29B 17/02 209/166 |
| 4,040,949 | A | * | 8/1977 | Saitoh | B03D 1/02 209/166 |
| 5,130,184 | A | * | 7/1992 | Ellis | C09D 5/18 428/920 |
| 5,980,968 | A | * | 11/1999 | Booth | A23L 2/38 426/74 |
| 2002/0094444 | A1 | * | 7/2002 | Nakata | B32B 27/08 525/437 |
| 2004/0013831 | A1 | * | 1/2004 | Whittaker | D21H 27/08 428/35.2 |
| 2012/0283363 | A1 | * | 11/2012 | Kumamoto | C08L 97/02 524/35 |
| 2018/0104347 | A1 | * | 4/2018 | Sintov | A61K 9/5115 |
| 2019/0211253 | A1 | * | 7/2019 | Fu | C09K 8/02 |
| 2021/0122923 | A1 | * | 4/2021 | Marcinko | C08K 5/101 |
| 2021/0169138 | A1 | * | 6/2021 | Hutchens | D04H 1/425 |
| 2023/0124025 | A1 | * | 4/2023 | Klier | C08G 63/199 528/302 |
| 2025/0134951 | A1 | * | 5/2025 | Xia | A61K 9/0019 |

OTHER PUBLICATIONS

Lekrine et al. (Journal of Materials Research and Technology, 30, 2024, 9656-9667) (Year: 2024).*
Dangtungee et al. (Polymer Testing 29, 2010, 188-195) (Year: 2010).*
Scaffaro et al. (Composites Science and Technology 190, 2020, 108008) (Year: 2020).*

* cited by examiner

*Primary Examiner* — Liam J Heincer
(74) *Attorney, Agent, or Firm* — MH2 Technology Law Group, LLP

(57) ABSTRACT

The present disclosure pertains to the field of waste management and material science. In particular, the present disclosure pertains to composite materials comprising reject brine, plant-biomass, and a biodegradable polymer and a process for its preparation. The composite enhances thermal insulation, moisture resistance, and mechanical strength, making it an eco-friendly alternative to conventional petroleum-based composites.

7 Claims, 2 Drawing Sheets

BIOCOMPOSITE MATERIAL COMPRISING REJECT BRINE AND PLANT-BIOMASS AND PREPARATION THEREOF

FIELD OF THE INVENTION

The present disclosure pertains to the field of waste management and material science. In particular, the present disclosure pertains to composite materials comprising reject brine, plant-biomass, and a biodegradable polymer, and a process for its preparation. The composite of the present disclosure focuses on transforming desalination by-products and plant-biomass into high-performance, biodegradable composite materials. The composite enhances thermal insulation, moisture resistance, and mechanical strength, making it an eco-friendly alternative to conventional composites.

BACKGROUND OF THE INVENTION

Background description includes information that may be useful in understanding the present invention. It is not an admission that any of the information provided herein is prior art or relevant to the presently claimed invention, or that any publication specifically or implicitly referenced is prior art.

Environmental pollution is amongst the most severe humanity problems, being the lead cause of mortality and morbidity. It emanates from the release of effluents and waste resulting from urbanization, industrialization, population growth, mining, and others to the environment, and more so waterways.

Biodegradable composites have thus gained attention as a sustainable solution to reduce environmental pollution in various ways. The attributes of biodegradable composites such as their ability to decompose naturally, reduced toxin emissions, energy efficiency etc. make biodegradable composites a promising option for addressing environmental pollution and promoting sustainability. There has been an increasing focus on incorporating waste material into composite products, particularly within the sustainability and environmental conservation framework.

Using bio-based materials is an approach that combines waste valorization with the production of high-value bio-products, contributing to a circular economy and sustainable development. Continuous research is required to improve yields, reduce costs, and ensure product quality. Achieving consistent quality and desired mechanical and thermal properties in the bio-composites can be challenging, which is crucial for the performance of the composite materials.

While biodegradable composites offer many environmental benefits, achieving moisture resistance along with superior mechanical and thermal properties can be challenging. To address these challenges, researchers have explored alternative, low-cost carbon sources and waste materials for the production of biodegradable composites.

Palm trees, which are extensively spread across several Asian nations, consist of significant amounts of non-food products, including leaves, which end up disposed as waste, leading to environmental pollution. There are over 120 million palm trees in the world with each tree producing approximately 20% of leaves annually, most of which end up in landfills, leading to extensive environmental damage. Therefore, there is a need to convert the biomass from palm tree leaves to usable forms in a bid to reduce environmental pollution.

Reject brine, which is generated as a byproduct of desalination processes, poses a significant environmental issue. While desalination is vital for supplying freshwater in arid regions, the concentrated saline byproduct can be challenging to dispose of without adversely affecting coastal ecosystems. Prior studies have explored the potential for repurposing reject brine in agricultural contexts, demonstrating its utility in irrigation systems to enhance crop yields and help mitigate coastal salinity levels. Nonetheless, managing reject brine remains problematic, particularly due to its high salinity and the presence of potential contaminants. There is a pressing need for innovative strategies to convert this byproduct from an environmental liability into a valuable resource.

Similarly, the underutilization of palm wood waste, particularly from date palm trees, has emerged as a significant concern. Numerous agricultural sectors produce substantial amounts of palm wood waste, much of which is either discarded or inefficiently managed. Recent research has shown that palm wood waste can be converted into composite materials suitable for construction and insulation applications. The mechanical properties of palm wood fibers have been identified as advantageous for use as reinforcement in bio-composites. However, one of the challenges in utilizing palm wood waste in composites lies in its compatibility with synthetic polymers like PLA, an area that necessitates further exploration to optimize material performance.

Polylactic acid (PLA) is a biodegradable polymer sourced from renewable materials, providing an eco-friendly alternative to traditional petroleum-based plastics. Due to its sustainable nature, PLA has attracted considerable attention as a potential component in diverse composite materials. Researchers have investigated methods to enhance the properties of PLA by incorporating various fillers, including natural fibers and nanomaterials. PLA composites have demonstrated promising thermal and mechanical properties suitable for insulation applications. However, PLA's performance in composite formulations is often hindered by its propensity to absorb moisture, which can degrade the material over time, especially when combined with hydrophilic fibers like those from palm wood. Addressing these challenges is essential for successfully developing PLA-based composites for insulation purposes.

Existing solutions primarily focus on its conversion into low-value products or energy sources, with limited exploration into high-performance applications. The compatibility issues between plant-biomass products and synthetic polymers can compromise the resulting composites' mechanical properties, limiting their commercial viability. Furthermore, the lack of standardized processing methods for incorporating plant-biomass into bio-composites hinders scalability and widespread adoption.

With growing environmental concerns and advances in this field, the development of more sustainable and eco-friendly alternatives is gaining momentum, providing consumers with more options that align with environmental values. Biodegradable composites with plant-biomass and biodegradable polymers remain as an area for research, as there is limited industrial experience and knowledge compared to more established materials. Therefore, there is a need to adopt and develop biodegradable composites for new high performance natural materials. The present invention seeks to address at least some of these issues.

SUMMARY OF THE INVENTION

According to a first aspect of the present invention, there is provided a biocomposite comprising: a biodegradable polymer, reject brine salts, and plant-biomass.

According to a second aspect of the present invention, there is provided a method manufacturing a biocomposite according to claim 1, wherein said method comprises: obtaining reject brine salts; obtaining plant-biomass; obtaining a biodegradable polymer; mixing the reject brine salts, plant-biomass and the biodegradable polymer to obtain a mixture; and subjecting the mixture to melting followed by molding to obtain the biocomposite material.

According to a third aspect of the present invention, there is provided a composite panel comprising a biodegradable composite according to the first aspect of the present invention.

In an embodiment, the composite of the present disclosure comprises:
- dried reject brine salts in an amount ranging from about 10 to 20 wt %;
- plant-biomass in an amount ranging from about 5 to 15 wt %; and
- a biodegradable polymer in an amount ranging from about 60 to 85 wt %.

In yet another aspect, the present disclosure provides materials for construction, advanced manufacturing, 3D printing, and aerospace applications comprising the composites of the present disclosure. The composites of the present disclosure offer a scalable and cost-effective solution for sustainable infrastructure.

BRIEF DESCRIPTION OF THE DRAWINGS

The subject matter that is regarded as the invention is particularly pointed out and distinctly claimed in the claims at the conclusion of the specification. The foregoing and other aspects, features, and advantages of the invention are apparent from the following detailed description taken in conjunction with the accompanying drawings in which:

Figure 1:
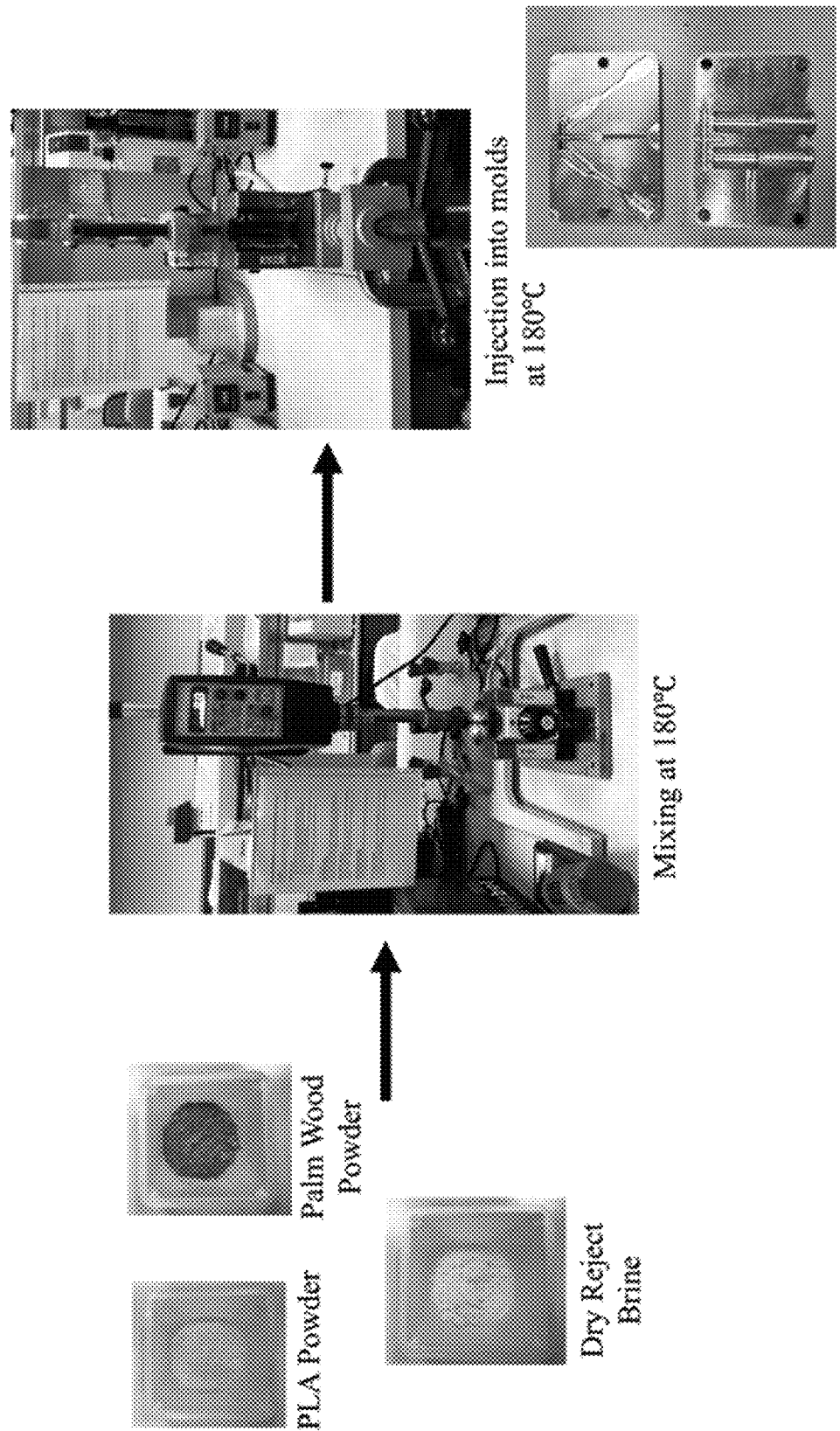
FIG. 1 illustrates a schematic diagram for preparation of a representative composite of the present disclosure.

Reference is made to the accompanying figures throughout the specification, which form a part hereof, and which is shown by way of illustration specific embodiments by which the invention may be practiced. It is to be understood that other embodiments may be utilized and logical changes may be made without departing from the scope of the present invention. The following detailed description and examples, therefore, is not to be taken in a limiting sense, and the scope of the present invention is defined by the appended claims.

DETAILED DESCRIPTION

For the purposes of the present invention, the following terms are defined below:

The articles "a" and "an" are used herein to refer to one or to more than one (i.e. to at least one) of the grammatical object of the article. By way of example, "an element" means one element or more than one element.

As used herein, the term "comprises" or "comprising" is generally used in the sense of include, that is to say permitting the presence of one or more features or components.

As used herein, the terms "optional" or "optionally" mean that the subsequently described event or circumstance may occur or may not occur, and that the description includes instances where the event or circumstance occurs as well as instances in which it does not.

The term plant biomass refers to materials made from natural fibers (like wood, straw, or plant fibers) combined with other biodegradable materials. These materials are more environmentally friendly than traditional composites because they come from renewable sources and can break down over time.

Where a range of values is provided, it is understood that each intervening value, to the tenth of the unit of the lower limit unless the context clearly dictates otherwise, between the upper and lower limit of that range and any other stated or intervening value in that stated range, is encompassed within the methods. Where the stated range includes one or both limits, ranges excluding either or both of those included limits are also included in the methods. Certain ranges are presented herein with numerical values being preceded by the term "about." The term "about" is used herein to provide literal support for the exact number that it precedes, as well as a number that is near to or approximately the number that the term precedes. For example, "about" can mean within one or more standard deviations, or within ±30%, 25%, 20%, 15%, 10% or 5% of the stated value.

Each embodiment is provided by way of explanation of the invention and not by way of limitation of the invention. In fact, it will be apparent to those skilled in the art that various modifications and variations can be made to the compounds, and methods described herein without departing from the scope or spirit of the invention. For instance, features illustrated or described as part of one embodiment can be applied to another embodiment to yield a still further embodiment. Thus, it is intended that the present invention includes such modifications and variations and their equivalents.

Other objects, feature, and aspects of the present invention are disclosed in or are obvious from, the following detailed description. It is to be understood by one of ordinary skill in the art that the present discussion is a description of exemplary embodiments only and is not to be construed as limiting the broader aspects of the present invention.

It is appreciated that certain features of the methods, which are, for clarity, described in the context of separate embodiments, may also be provided in combination in a single embodiment. Conversely, various features of the methods, which are, for brevity, described in the context of a single embodiment, may also be provided separately or in any suitable sub-combination. All combinations of the embodiments are specifically embraced by the present invention and are disclosed herein just as if each and every combination was individually and explicitly disclosed, to the extent that such combinations embrace operable processes and/or composites/scaffolds.

Reference throughout this specification to "certain embodiments", "further embodiments", "specific embodiments", "further specific embodiment", "one embodiment", "a non-limiting embodiment", "an exemplary embodiment", "some instances", or "further instances", means that a particular feature, structure or characteristic described in connection with the embodiment may be included in at least one embodiment of the present disclosure. As used herein, the terms 'include', 'have', 'comprise', 'contain' etc. or any form of said terms such as 'having', 'including', 'containing', 'comprising' or 'comprises' are inclusive and will be understood to imply the inclusion of a stated element, integer or step, or group of elements, integers or steps, but not the exclusion of any other element, integer or step, or group of elements, integers or steps.

The use of any and all examples, or exemplary language (e.g., "such as") provided with respect to certain embodiments herein is intended merely to better illustrate the disclosure and does not pose a limitation on the scope of the disclosure otherwise claimed. As used herein, the term "invention", "present invention", "disclosure" or "present disclosure" as used herein is a non-limiting term and is not intended to refer to any single embodiment of the particular invention but encompasses all possible embodiments as described in the specification. The terms "process(es)" and "method(s)" are considered interchangeable within this disclosure.

The term "composite" as used herein refers to a material made from two or more distinct substances that are combined together to form a new material with properties superior to those of the individual components. The composite is made up of a matrix and materials which strengthen the matrix, and are designed to take advantage of the strengths of each component.

The term "reject brine" as used herein refers to the wastewater or byproduct that is generated particularly in desalination (saltwater treatment), water purification, or reverse osmosis filtration systems. It is the leftover concentrated solution of salts and other chemicals that were removed from the treated water during the process. The term as herein also encompasses its concentrated form, wherein the reject brine is either evaporated or dried.

In one aspect, the present disclosure provides a composite comprising reject brine, plant-biomass, and a biodegradable polymer.

Reject brine (e.g. reject brine salts) for the purposes of the present disclosure can be obtained from desalination plants, salt production plants, water purification plants, food processing plants and the like. The environmental impact of brine discharge remains a critical concern, as improper management can lead to detrimental effects on marine ecosystems. The present disclosure mitigates this issue by utilizing the reject brine for constructive purposes, thereby curbing the environmental risks it poses if not appropriately managed.

In an embodiment, the present disclosure employs reject brine from desalination plants. The invention of the present disclosure is crucial to address the challenges of disposal of reject brine and environmental sustainability in regions heavily reliant on desalination like United Arab Emirates (UAE).

The reject brine is suitably crystalized to obtain dried reject brine salts or crystals before adding to the composite.

Apart from sodium chloride which forms the main component of reject brine salts/crystals, it can comprise other salts and minerals such as magnesium chloride, calcium chloride, potassium chloride, sulfates, bicarbonates etc. The trace amounts of calcium, magnesium, and sulfate ions, improve fire resistance and dimensional stability. The inclusion of dried reject brine crystals in a composite enhances hydrophobicity, making the material more resistant to moisture absorption and degradation compared to standard bio-based composites.

The reject brine can be present in an amount of at least 10 percent to the total weight of the composite. In an embodiment, it is present in an amount ranging from about 10 to 20 wt %, including a wt % of 5, 8, 10, 15 or 20 to the total weight of the composite. In some embodiments, the reject brine salts are present in an amount ranging from about 1 wt. % to 40 wt. %, based on the total weight of the biocomposite. For example, the reject brine salts are present in an amount ranging from about 5 wt. % to 30 wt. %, preferably about 10 wt. % to 20 wt. % based on the total weight of the biocomposite.

The incorporation of reject brine into the composite matrix potentially improves the moisture resistance, fire retardancy, and durability of the insulation material, addressing common issues associated with traditional composites.

The plant-biomass which can be employed for the purposes of the present disclosure can be a whole plant, any specific part of the plant, or byproducts obtained by processing plant waste. The plant-biomass can be selected from leaves, rachis, stems, roots, flowers, fruits, seeds, waste, and other components. In certain embodiments, the plant-biomass employed for the purposes of the present invention can be obtained from palm tree, sugarcane, rice husk, coconut coir, corn stover, wheat straw, wood residues, switch grass and the like, or their combinations thereof. These sources contribute to reducing waste and promote the use of renewable materials in composite applications.

In an embodiment, specific parts of a plant can be employed in the production of bio-composites, such as leaves, fonds, fibrous material left after extraction of essential materials, fibrous portions of the plants/trees such as coconut coir, palm wood, palm kernel cake, stems, and stalks, sugarcane bagasse, root materials, etc.

In a specific embodiment, the plant-biomass is obtained from palm tree. In an embodiment, palm waste, including leaves, rachis, and wood of the palm tree, which are generally considered as waste, is employed for the purposes of the present invention. In a preferred embodiment, the plant-biomass employed for the purposes of the present invention is palm wood fiber powder obtained from the wood of palm trees, or date palm fonds or their mixtures.

The plant-biomass can be present in an amount of at least 5% of the total weight of the composite. In an embodiment, the plant-biomass is present in an amount ranging from about 5 to 15 wt %, including a wt % of 5, 8, 10, 12 or 15 to the total weight of the composite. In some embodiments, the plant-biomass is present in an amount ranging from about 1 wt. % to 30 wt. %, based on the total weight of the biocomposite. For example, the plant-biomass is present in an amount ranging from about 5 wt. % to 20 wt. %, preferably about 5 wt. % to 15 wt. % based on the total weight of the biocomposite.

In a specific embodiment, the plant-biomass is palm wood fiber. Palm wood fiber provides reinforcement to the composite. Palm wood fiber employed for the purposes of the present invention can be powdered suitably by mechanical milling to 50 to 200 microns.

In another specific embodiment, the plant-biomass is carbonized palm wood waste or date palm fonds. The carbonized palm wood and date palm fonds improve tensile strength and compressive performance. The particle size of the carbonized palm wood, or date palm fonds after grinding may range from about 1 to 100 nm.

In a further specific embodiment, the plant-biomass employed is a combination of palm wood fiber having a particle size in the range of about 50 to 200 microns, and carbonized palm wood, or carbonized date palm fonds having a particle size in the range of about 10 to 100 nm.

The present disclosure in a specific embodiment carries out the task of sustainable waste management of large amounts of palm wood waste, primarily from date palm cultivation, which often ends up in landfills. The composite of the present disclosure provides a viable alternative to conventional composite materials which are often petroleum-based and hence are environmentally harmful. By transforming plant-biomass into a valuable product, the disclosure promotes a circular economy and contributes to the global sustainability goals.

The biodegradable polymer which may be employed for the purposes of the present disclosure can be selected from polylactic acid (PLA), starch-based polymers, cellulose based polymers, chitosan and combinations thereof. In a preferred embodiment, the biodegradable polymer is PLA.

PLA is recognized for its excellent thermal insulation properties, with studies showing low thermal conductivity values, making it suitable for insulation applications. The addition of palm wood enhances the mechanical properties of PLA composites, providing a lightweight and effective insulation solution.

The biodegradable polymer can be present in an amount of at least 60 percent of the total weight of the composite. In an embodiment, the plant-biomass is present in an amount ranging from about 60 to 80 wt %, including a wt % of 65, 70, 75, or 80 to the total weight of the composite. In some embodiments, the biodegradable polymer is present in an amount ranging from about 40 wt. % to 98 wt. %, based on the total weight of the biocomposite. For example, the biodegradable polymer is present in an amount ranging from about 50 wt. % to 90 wt. %, preferably about 60 wt. % to 85 wt. % based on the total weight of the biocomposite.

The polymer provides structural integrity to the composite. Through maintaining PLA as the dominant matrix material, our formulation ensures stronger polymer encapsulation, better adhesion, and uniform reinforcement fiber dispersion, improving mechanical strength, impact resistance, and durability. Additionally, the higher PLA percentage minimizes water absorption, significantly improving moisture resistance and dimensional stability, making the material more reliable in humid environments.

The composite of the present disclosure can further comprise additional components selected from graphene oxide, mineral fillers, crosslinking agents, natural resins, plasticizers etc. The additional components can be present, independently, at a weight percentage of about 0.1 to about 10 wt %, or from about 0.1 to 5 wt %, or from about 0.5 to 2 wt % to the total weight of the composite.

Incorporating these additional components into composite material can lead to significant improvements in various properties, making them suitable for a wider range of applications. This versatility allows for the tailoring of composites to meet specific performance requirements while promoting sustainability.

In a specific embodiment, the composite of the present disclosure comprises graphene oxide in an amount ranging from about 0.5 to 2.0 wt %. In some embodiments, the graphene oxide is present in an amount ranging from about 0.1 wt. % to 5 wt. %, based on the total weight of the biocomposite. For example, the graphene oxide is present in an amount ranging from about 0.5 wt. % to 3 wt. %, based on the total weight of the biocomposite. The presence of graphene oxide enhances mechanical durability and electrical conductivity, allowing the material to be used in electromagnetic interference (EMI) shielding applications.

In an embodiment, the composite of the present disclosure comprises:
dried reject brine salts in an amount ranging from about 10 to 20 wt %;
plant-biomass in an amount ranging from about 5 to 15 wt %; and
biodegradable polymer in an amount ranging from about 60 to 85 wt %.

In a specific embodiment, the biodegradable composite of the present disclosure comprises:
dried reject brine salts in an amount ranging from about 10 to 20 wt %;
palm waste in an amount ranging from about 5 to 15 wt %; and
polylactic acid in an amount ranging from about 60 to 85 wt %.

In a further specific embodiment, the biodegradable composite of the present disclosure comprises:
dried reject brine salts in an amount ranging from about 10 to 20 wt %;
palm wood fiber powder and/or palm fonds in an amount ranging from about 5 to 15 wt %;
polylactic acid in an amount ranging from about 60 to 85 wt %; and
graphene oxide and/or carbonized palm wood nanoparticles in an amount ranging from about 0.5 to 2 wt %.

The composite of the present disclosure ensure polymer encapsulation, thereby enhancing adhesion between components. The composite prevents fiber agglomeration, and ensures consistent composite properties, making the material more durable and processable for advanced applications like 3D printing and structural insulation.

The nano-carbon fiber's inclusion in a combination of plant biomass and bio-binder enhances both the thermal and mechanical properties simultaneously, providing a balance of insulation, stiffness, and load-bearing capacity. Overall, the composite of the present disclosure outperforms existing biodegradable composites while offering a more sustainable, moisture-resistant, fire-safe, and cost-effective alternative to conventional solutions. The composite of the present disclosure ensures a well-balanced material composition that provides structural integrity and enhanced adhesion with the PLA matrix.

In an embodiment, the biodegradable composite of the present disclosure has a compression strength of at least about 75 to 90 MPa, stiffness of at least about 4.5 MPa to 6 MPa, and toughness of at least 3000 MPa. The composite of the present disclosure achieves low thermal conductivity of less than 0.035 W/m·K and high compressive strength of more than 5 MPa.

The composite material of the present disclosure enhances the thermal insulation properties while being environmentally friendly leveraging the unique properties of palm wood fibers and reject brine to improve mechanical strength.

The primary objective of the present disclosure is to develop an innovative approach to manage reject brine and utilize palm wood waste globally by creating sustainable insulation materials by integrating these two waste streams with polylactic acid (PLA). This initiative is crucial as it addresses the dual challenges of environmental sustainability and resource efficiency in a region heavily reliant on desalination and agriculture like United Arab Emirates (UAE).

One of the standout features of composite of the present disclosure is its simultaneous achievement of low thermal conductivity of less than 0.035 W/m·K and high compressive strength of more than 5 MPa, outperforming many biodegradable and bio-based insulation materials, which often suffers from structural weaknesses. This is a rare combination in material engineering. The composite's ability to achieve high thermal conductivity while maintaining impressive compressive strength provides a solution to industries that require materials with these qualities.

Through transforming reject brine, a byproduct of desalination, into a resource for a biodegradable composite its harmful environmental impacts are mitigated while simultaneously addressing water scarcity issues. Furthermore, utilizing palm wood waste, reduces landfill waste and creates a valuable input for composite materials. The integration of these waste materials with PLA, a biodegradable polymer, presents a composite that can serve as an eco-friendly insulation solution.

In another aspect, the present disclosure provides a method of manufacturing a biocomposite according to claim 1, wherein said method comprises: obtaining reject brine salts; obtaining plant-biomass; obtaining a biodegradable polymer; mixing the reject brine salts, plant-biomass and the biodegradable polymer to obtain a mixture; and subjecting the mixture to melting followed by molding to obtain the biocomposite material.

In another aspect, the present disclosure provides a process for the preparation of a composite comprising reject brine, plant-biomass, and a biodegradable polymer, comprising the steps of:
 a) drying reject brine solution to form dried brine salts;
 b) mixing the dried brine salts obtained from step a) with plant-biomass, and a biodegradable polymer to obtain a mixture; and
 c) subjecting the mixture obtained from step b) to melting followed by molding.

In certain embodiments of the process, the sources for the reject brine, the plant-biomass, and the biodegradable polymer and their quantities are the same as defined in the preceding embodiments.

The reject brine is suitably dried or crystallized before adding to the composite. Crystallization can be carried out using evaporation, drying, cooling crystallization, or by concentration. Typically, the process involves evaporation by heating to a temperature of about 100° C. to cause the water to evaporate, and the salts to crystallize or drying to remove water content of the reject brine using heat or air circulation. In an embodiment, the process involves drying at about 100° C. for about 24 hours to form crystalline salts.

In an embodiment, when the plant-biomass is palm wood fiber, the process involves alkaline treatment of the palm wood fiber with sodium hydroxide or potassium hydroxide before mixing the components. Alkaline treatment modifies the fiber surface, removes impurities, and enhances interfacial bonding with PLA, resulting in better mechanical strength, reduced water absorption, and improved composite durability. This treatment reduces moisture absorption by the wood by at least 20% and improves adhesion with the biodegradable polymer matrix. The treated wood is mechanically milled to reduce the size to about 50 to 200 microns.

The plant-biomass can be suitably processed before use. Processing techniques include cleaning, size reduction, sieving and sorting, modification by chemical treatment such as carbonization, etc.

In an embodiment, the plant-biomass is reduced in size by mechanical milling, shredding or grinding. The size of the plant-biomass can be reduced to the dimensions of microns of the range of about 50 to 500 microns, or from about 50 to 300 microns, or from about 50 to 200 microns. This optimized particle size enhances processability, allowing for more uniform mixing, efficient melt blending, and compatibility with advanced fabrication techniques.

In another embodiment, the plant-biomass is subjected to carbonization. Carbonization is carried out by subjecting the plant-biomass to thermal decomposition in the absence of oxygen to produce biochar. The temperature employed for thermal decomposition can range from about 400 to 700° C., or from about 400 to 600° C. After carbonization, the biochar can suitably be ground to achieve a smaller particle size in the range of micrometers or nanometer (nm) range.

In a preferred embodiment, the carbonized material is ground to a size of about 1 to 100 nm.

In a further specific embodiment, the process of the present disclosure comprises adding carbonized palm wood or date palm fond nanoparticles at a weight percentage of 0.5-2% to enhance thermal stability and mechanical strength. The addition is suitably carried out in step b).

The process of mixing in step b) involves mechanical mixing of components, or mixing using high shear mixtures. The high shear mixtures may be selected from the group comprising homogenizers, ultrasonic mixtures, high shear batch mixers, centrifugal or jet mixers and combinations thereof to get a uniform mixture.

The choice of melting and molding method in step c) depends on the type of composite to be produced and the desired end properties of the composite material. Different combinations of processes such as melting and injection molding, compression molding, extrusion and injection molding, and resin transfer molding and combinations thereof can be used to tailor the composite material's properties for specific applications.

In a specific embodiment, the conditions for step c) are melting of the mixture followed by injection molding. Melting is suitably carried out at temperature of about 150° C. to 300° C., or from about 150° C. to 200° C., or from about 150 to 180° C.

In an embodiment, the molten composite material can be shaped using injection molding to create panels, mold structures, and other complex shapes that require high precision and repeatability. Injection molding enables precise control over material flow, improved fiber dispersion, and enhanced polymer encapsulation, leading to greater structural uniformity and superior mechanical properties. Injection molding allows for complex geometries, faster production cycles, and better suitability for high-performance applications such as 3D printing and prefabricated insulation panels.

The process of molding is followed by cooling to solidify the molten composite material and curing to harden or for crosslinking of the materials of the composite. Cooling can be carried out by air cooling or water cooling. Followed by cooling the composite is cured by applying heat and/or pressure to promote chemical crosslinking. Optionally curing agents are added to facilitate curing.

In a specific embodiment, the process involves a process for preparation of a composite comprising reject brine, palm wood waste and PLA comprising the steps of:
 a) drying reject brine solution to form dried brine salts;
 b) processing palm wood waste by mechanical milling into particles having a size in the range of about 50 to 200 microns;
 c) mixing the dried brine salts from step a) in an amount ranging from about 10-20 wt %; the palm wood waste from step b) in an amount ranging from about ranging from about 5 to 15 wt %; and a biodegradable polymer in an amount ranging from about 60 to 85 wt % in a high shear mixture to obtain a mixture;
 d) melting the mixture obtained from step c) at about 180° C. to obtain a molten composite;
 e) injection molding the molten composite obtained from step d) to obtain molded composite; and
 f) cooling and curing the molded composite to obtain a biodegradable composite.

In a further specific embodiment, the process involves applying a water-based bio-resin coating post injection molding and curing the composite to further reduce moisture absorption, extending material longevity in humid climates.

The bio-resins may be selected from starch based, soyabean, or corn based resins, or any plant based polyesters.

In a further specific embodiment, the composite material is foamed to create micro air pockets that further lower its thermal conductivity to about 0.025 W/m·K. Foaming can either be carried out by chemical or physical methods, or a foaming agent may be injected during injection molding process causing the matrix to foam and fill-in the mold. Controlled foaming process introduces micro air pockets, significantly enhancing thermal insulation by reducing heat transfer more effectively.

In a further specific embodiment, the injection molded composite undergoes a plasma surface treatment by exposing the surface of the composite to ionized gas. This process enhances its hydrophobicity and reduces water absorption to below 2%, improving its water resistance, durability and real-world application in humid environments.

In a further specific embodiment, the process involves optional addition of components selected from graphene oxide, mineral fillers, biopolymers, crosslinking agents, natural resins, plasticizers etc. The additional components can be added along with the core components before the step of mixing.

The method of the present disclosure systematically integrates dried reject brine salts, palm wood fiber, and PLA through controlled mixing, encapsulation, and molding to optimize thermal insulation, fire resistance, and moisture stability. This structured and scalable manufacturing process ensures superior material consistency and performance. The method ensures complete polymer-fiber integration by melting the PLA matrix, allowing for superior dispersion of fillers such as dried brine salts and palm wood fibers.

In an embodiment, the process for producing the bio-composite can be easily scaled for industrial production. The low-energy manufacturing process, combined with widely available natural materials, makes this process both practical and commercially viable without compromising performance. Thus, the process is simple and scalable, making it energy-efficient and commercially viable for large-scale production.

The process of the present disclosure which combines reject brine, plant-biomass and a biodegradable polymer addresses several critical needs. Firstly, it offers a sustainable solution for managing reject brine, transforming a waste product into a resource that can enhance agricultural productivity and reduce environmental impacts. Secondly, by leveraging local plant-biomass, the project promotes circular economy principles, reducing landfill contributions and fostering sustainable practices within the construction industry.

The process of the present disclosure addresses critical environmental challenges and presents a viable pathway for innovation in waste management and material science. By integrating reject brine and palm wood waste into the production of sustainable insulation materials. This initiative has the potential to create significant and lasting impacts on the global environmental sustainability efforts.

The process of the present disclosure provides a strategy for converting waste materials into valuable, eco-friendly products. The integration of these components into a cohesive composite material provides a sustainable alternative to conventional composites. This approach is in line with global efforts to minimize waste and transition toward a circular economy, where byproducts and waste materials are repurposed for new applications.

In yet another aspect, the present disclosure provides materials for construction, advanced manufacturing, 3D printing, and aerospace applications comprising the composites of the present disclosure. The composite of the present disclosure is engineered for superior acoustic performance through controlled porosity and optimized material composition, ensuring higher sound absorption and improved noise reduction. The intentional microstructural tuning in our method, including foaming and fiber dispersion, enhances soundwave dissipation, making it more effective for acoustic insulation applications than the prior art's rigid core board design The composites of the present invention offer a scalable and cost-effective solution for sustainable infrastructure. The composite of the present disclosure is UV-resistant, prevents degradation when exposed to prolonged sunlight in outdoor applications. The composite of the present disclosure improves microbial growth resistance because of the brine present in it and makes the composite ideal for hospitals, food storage, and cleanroom applications.

The composite of the present disclosure can be injection-molded or 3D printed, offering precision customization and reduced material waste. It can be used to fabricate customized building components with precisely controlled geometries.

In an embodiment, the present disclosure provides building material for construction, automative, aerospace, and protective equipment, comprising the bio-composite of the present disclosure. The construction material is a panel selected from wall panel, floor panel, ceiling panel, insulating panel, and the like.

In an embodiment, the panel comprising composite of the present disclosure meets ASTM E84 Class A fire safety standards and exhibits self-extinguishing behavior when exposed to flames. The trace minerals in reject brine (calcium, magnesium, sulfate ions) enhance fire resistance, reducing flammability compared to standard organic-based insulation.

In another embodiment, the panel comprising the composite of the present disclosure is capable of soundproofing, achieves a noise reduction coefficient (NRC) of at least 0.75 making it suitable for acoustic insulation in office spaces, auditoriums, and industrial environments.

In another embodiment, the panel comprising the composite of the present disclosure has flame-retardant properties, water resistance, and biodegradability, making it ideal for sustainable construction applications.

In a specific embodiment, the composite of the present disclosure is employed in wall insulation panels for energy-efficient buildings.

In a further specific embodiment, the composite of the present disclosure is employed in ceiling insulation for heat regulation In a further specific embodiment, the composite of the present disclosure is employed in lightweight structural reinforcements in prefabricated construction modules.

The composite of the present disclosure is biodegradable within 3-5 years, reducing environmental impact and promoting sustainable construction.

Companies involved in industries such as construction, automotive, aerospace, and protective equipment can employ the sustainable composite of the present disclosure for its versatile applications. In construction, it could be used in green building materials and infrastructure projects. The automotive sector could utilize it for lightweight, fuel-efficient vehicles, while aerospace manufacturers might adopt it for its strength and thermal insulation in high-performance parts. Protective equipment manufacturers could also find value in its durability and eco-friendly composition.

Construction and infrastructure industries, particularly those focused on green building and renewable energy projects, would be interested in the composites of the present disclosure for its eco-friendly properties and scalability. Additionally, the aerospace and automotive sectors, which require materials with superior mechanical strength and thermal insulation, would find value in the composite's unique benefits. The growing emphasis on sustainable development across various industries creates a substantial market opportunity for this high-performance, bio-based material Markets Interest.

The present disclosure now being generally described, it will be more readily understood by reference to the following examples, which are included merely for purposes of illustration of certain aspects and embodiments of the present disclosure and are not intended to limit the present disclosure in any way.

EXAMPLES

Example 1: Process for Preparing the Composite

Step 1: Drying the Reject Brine Solution: Step 2: Composite Mixture Preparation

Drying the reject brine solution to obtain crystalline salts was achieved by heating/drying the brine solution in an oven at 100° C. for 24 hours. This controlled drying process facilitates water evaporation while preserving the salts' integrity. The process was monitored to ensure complete evaporation without thermal degradation of the salts, which is crucial for maintaining their chemical properties.

Step 2: Composite Mixture Preparation

A mixture was prepared consisting of (wt. %):
10% dried reject brine crystals;
10% palm wood fiber powder; and
80% PLA powder.

The palm wood fibers were processed into a fine powder using mechanical milling to enhance compatibility with PLA. This milling process increased the surface area of the fibers, promoting better interaction with the PLA matrix. The resulting powder was characterized for particle size distribution to ensure uniformity.

The mixture was thoroughly blended to ensure uniform distribution of all components. This was achieved using a high-shear or planetary mixer, which helps achieve a homogenous mixture.

Step 3: Heating and Injection Molding

The blended mixture was heated to 180° C., which is above the melting point of PLA, to facilitate proper mixing and flow characteristics. This temperature is critical to ensure that the PLA matrix fully encapsulates the palm wood fibers and brine crystals.

The molten mixture was then injected into dog-bone and cylindrical molds using an injection molding machine. This step is essential for creating standardized test specimens for mechanical evaluation. The injection molding parameters, such as pressure, injection speed, and cooling time, were optimized to ensure high-quality mold filling and minimize defects.

Example 2: Composite Comprising Dried Reject Brine, Palm Powder, and PLA Powder

Components of the composite (by wt. %):
10% dried reject brine crystals;
10% palm wood fiber powder; and
80% PLA powder.

The composite is prepared using a process described in Example 1.

Example 3: Characterization and Testing

Following the preparation of the composite material of Example 2, using a process as defined in Example 1, a focused series of characterization and testing procedures were conducted to evaluate its mechanical properties, specifically through tension and compression tests. This phase is critical for understanding the performance of the composite insulation material made from reject brine, palm wood fiber powder, and polylactic acid (PLA).

Mechanical testing involve standardized procedures to assess tensile strength is essential for evaluating the structural performance of the composite material under various loading conditions.

Figure 2:
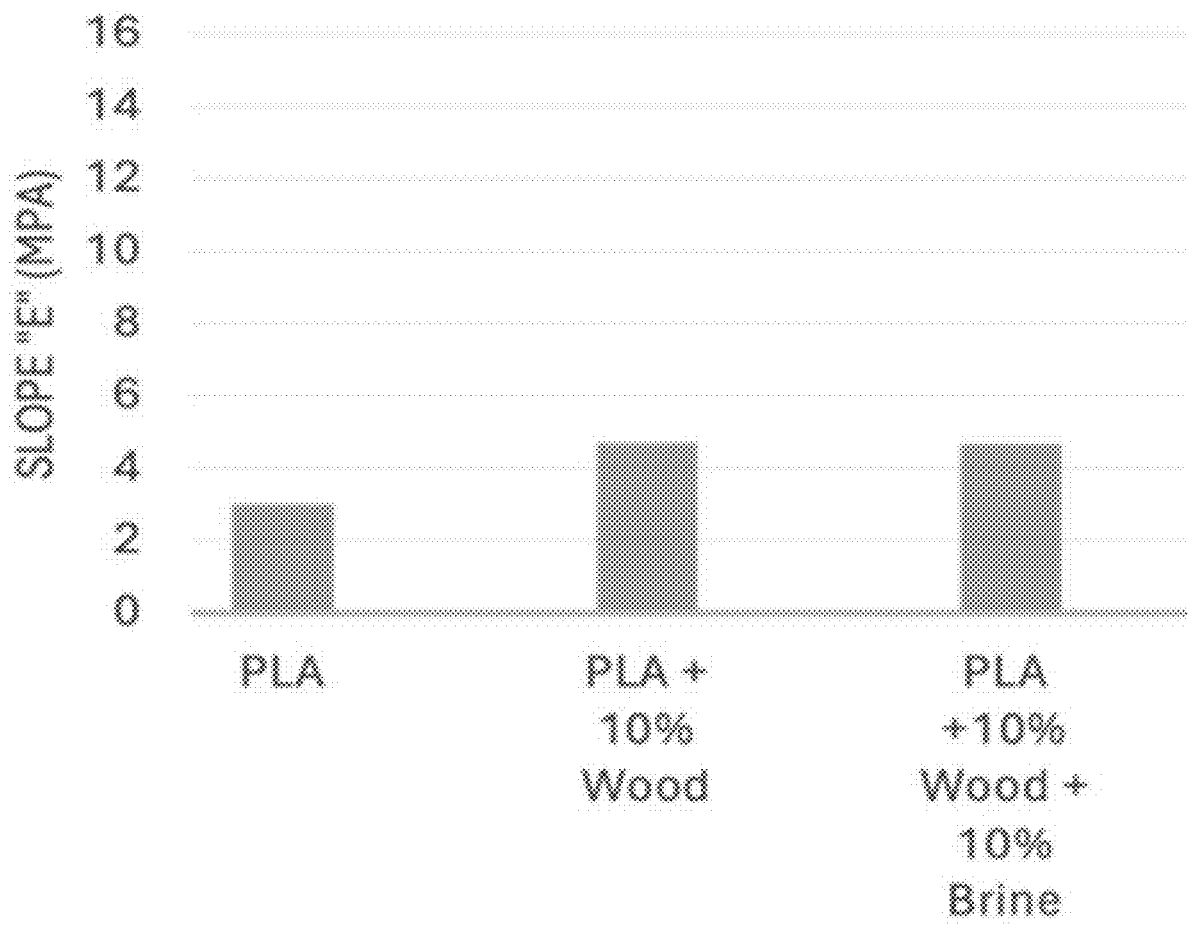
FIG. 2 illustrates stiffness of polylactic acid (PLA), combination of PLA and wood, and a composite material of the present disclosure.

Stiffness:

The stiffness of pure PLA was measured at about 2.5 M Pa. When 10% wood was added, the stiffness increases significantly to around 4.5 M Pa. This increase in stiffness is a positive outcome, as it indicates that the addition of wood fibers enhances the rigidity of the composite, making it more suitable for applications where structural integrity is essential. When brine was added to the PLA-wood mixture, the stiffness remains roughly the same as that of the PLA-wood composite. This finding suggests that the brine does not significantly alter the stiffness of the material, indicating that the reinforcing effect of the wood fibers is maintained despite the presence of brine. This stability in stiffness is advantageous, as it implies that the composite retains its structural performance even with the incorporation of reject brine. The results are illustrated in FIG. 2.

Throughout the description and claims of this specification, the words "comprise" and "contain" and variations of them mean "including but not limited to", and they are not intended to (and do not) exclude other moieties, additives, components, integers or steps. Throughout the description and claims of this specification, the singular encompasses the plural unless the context otherwise requires. In particular, where the indefinite article is used, the specification is to be understood as contemplating plurality as well as singularity, unless the context requires otherwise.

Features, integers, characteristics, or groups described in conjunction with a particular aspect, embodiment or example of the invention are to be understood to be applicable to any other aspect, embodiment or example described herein unless incompatible therewith. All of the features disclosed in this specification (including any accompanying claims, abstract and drawings), and/or all of the steps of any method or process so disclosed, may be combined in any combination, except combinations where at least some of such features and/or steps are mutually exclusive. The invention is not restricted to the details of any foregoing embodiments. The invention extends to any novel one, or any novel combination, of the features disclosed in this specification (including any accompanying claims, abstract and drawings), or to any novel one, or any novel combination, of the steps of any method or process so disclosed.

It will be appreciated by persons skilled in the art that the above embodiment(s) have been described by way of example only and not in any limitative sense, and that various alterations and modifications are possible without departing from the spirit and scope of the invention as defined by the appended claims. Various modifications to the detailed designs as described above are possible.

The invention claimed is:

1. A method of manufacturing a biocomposite, wherein said method comprises:
   obtaining reject brine salts, wherein obtaining the reject brine salts comprises:
      obtaining a reject brine solution; and
      drying the reject brine solution to obtain reject brine salts;
   obtaining plant-biomass;
   obtaining a biodegradable polymer;
   mixing the reject brine salts, plant-biomass and the biodegradable polymer to obtain a mixture; and
   subjecting the mixture to melting followed by molding to obtain the biocomposite material.

2. The method according to claim 1, wherein, after obtaining the plant-biomass, the plant-biomass is milled into a powder of particles with an average diameter in the range between 50 microns to 200 microns.

3. The method according to claim 1, wherein, after obtaining the plant-biomass, the plant-biomass is subjected to alkaline treatment.

4. The method according to claim 1, wherein the plant-biomass is obtained from palm trees or date palm fonds.

5. The method according to claim 1, wherein the biodegradable polymer is PLA.

6. The method according to claim 1, wherein the method further comprises applying a water-based bio-resin coating on the biocomposite obtained after molding.

7. The method according to claim 1, wherein the mixture further comprises graphene oxide and/or carbonized palm wood nanoparticles.

* * * * *